Patented May 16, 1950

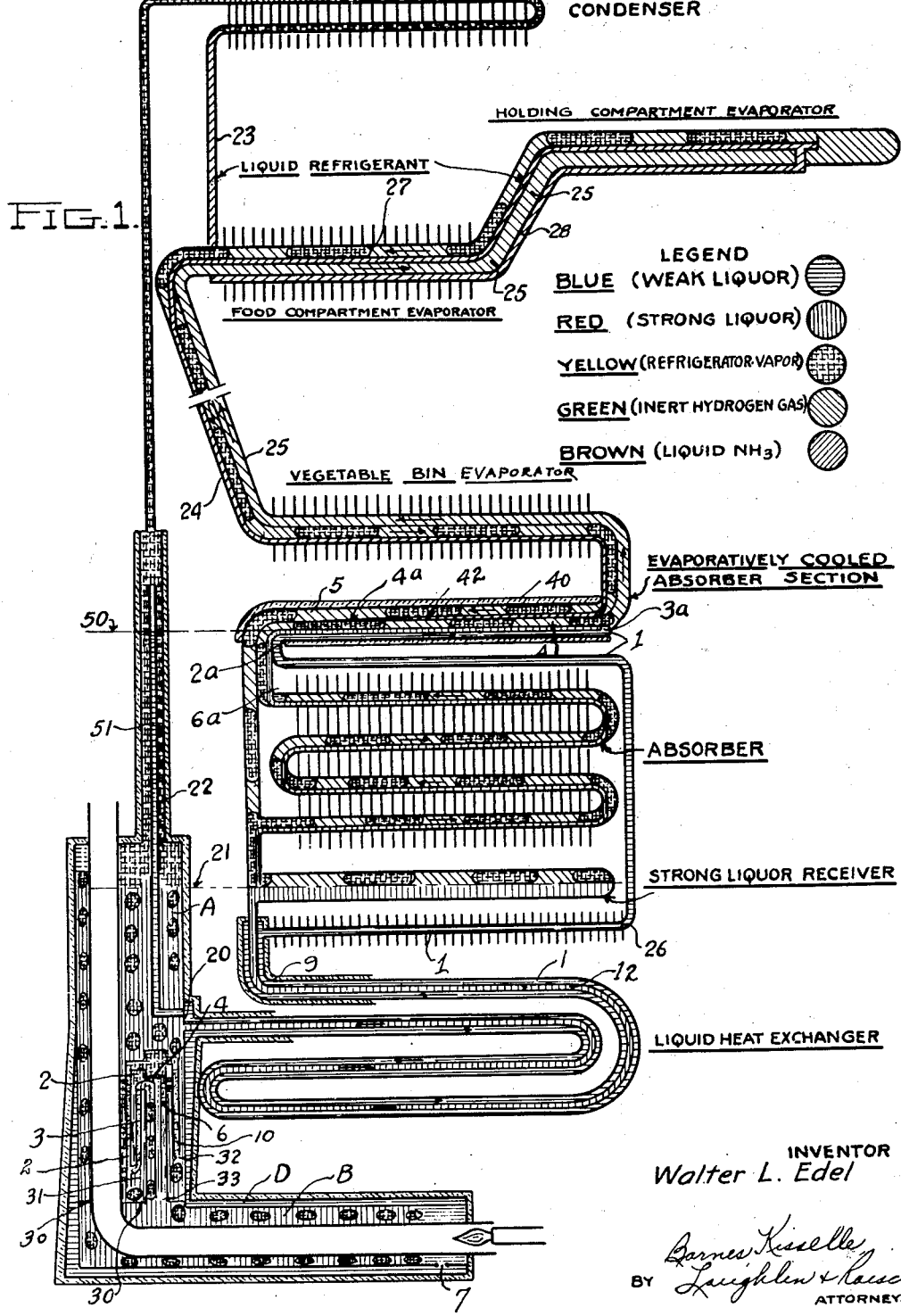

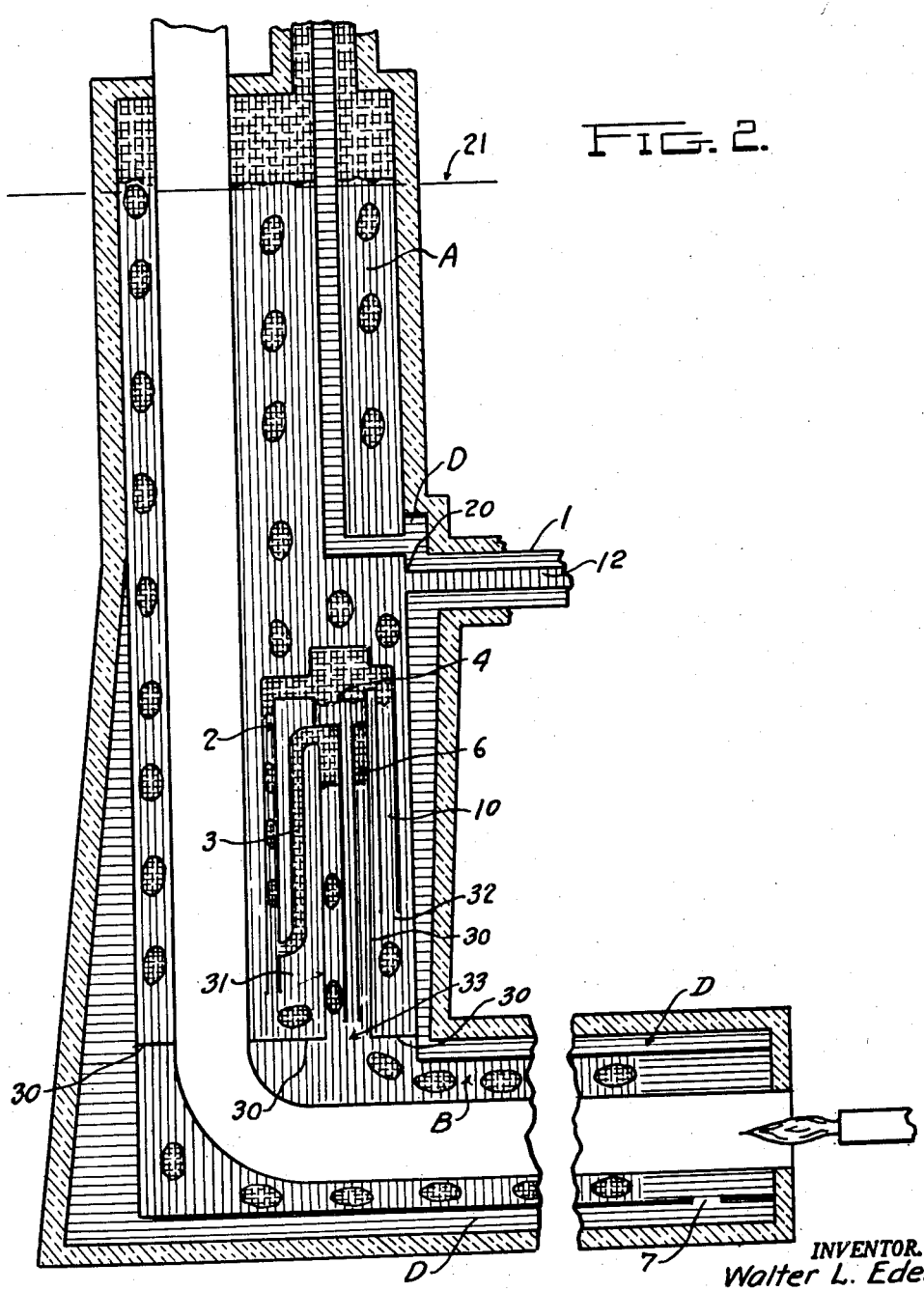

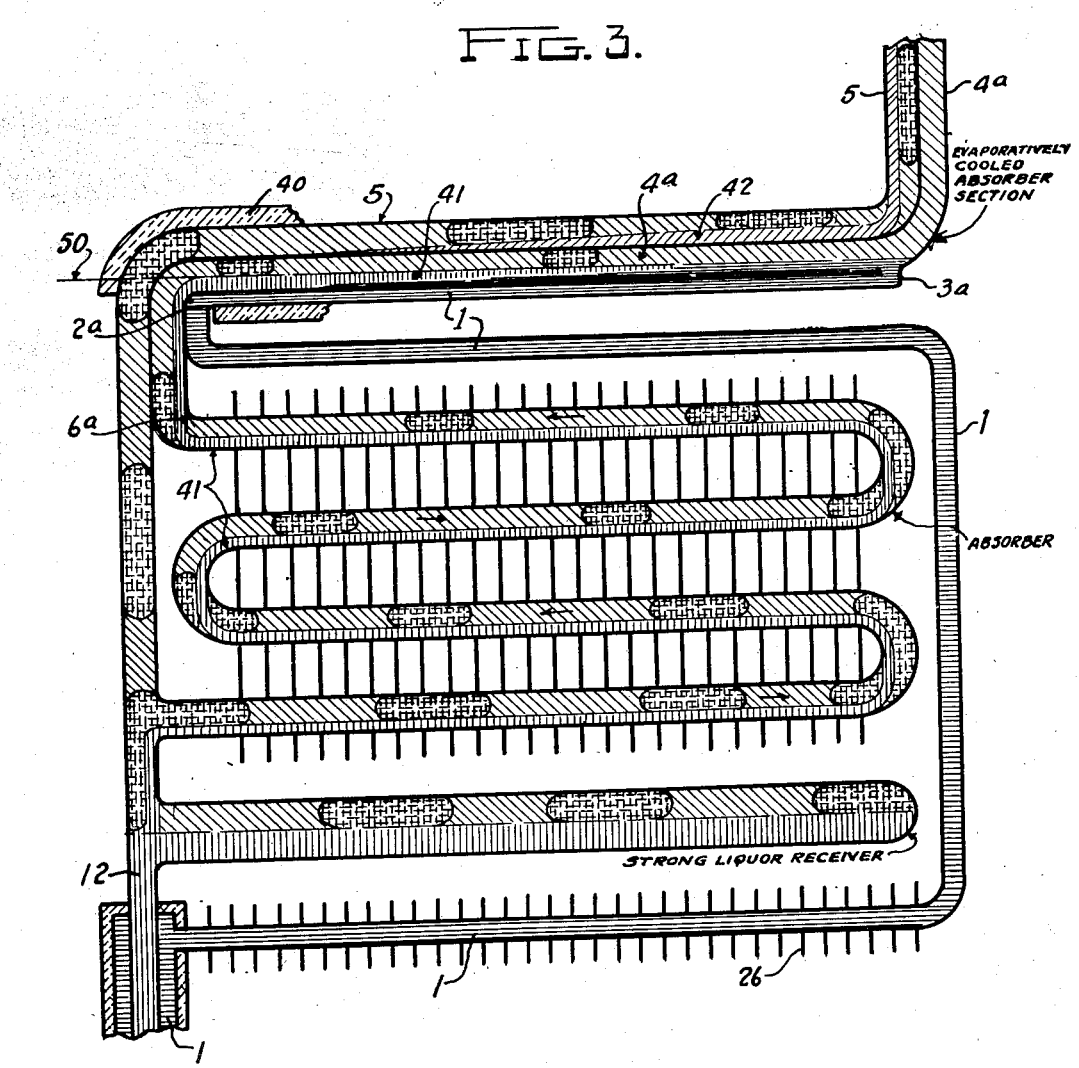

2,507,624

UNITED STATES PATENT OFFICE 2,507,624

ABSORBER WITH EVAPORATIVELY-COOLED SECTION

Walter L. Edel, Louisville, Ky., assignor to Clayton & Lambert Manufacturing Company, Louisville, Ky., a corporation of Delaware Application May 5, 1947, Serial No. 746,057

7 Claims. (Cl. 62—119.5)

1

This invention relates to an evaporatively-cooled absorber section and an absorption refrigerant system in which such an absorber is used. Its functioning is related to the heat input into the generator.

It is the object of the invention to utilize some of the refrigerating capacity of the system to so cool an added section of the absorber as to lower the temperature in this section and increase the refrigerant vapor pressure in the conduit taking the refrigerant vapor to the absorber to thereby increase the absorption capacity of the absorbent in the absorber. This evaporatively-cooled section of the absorber is located at a point where the outgoing inert gas stream is about to leave the absorber on its way to the evaporator. It denudes the outgoing inert gas stream of some, if not most, of the refrigerant vapors that have not been absorbed in the conventional air-cooled portion of the absorber. This better absorption of the refrigerant vapors results in increasing the partial pressure of the inert gas of the stream of gases leaving the evaporative absorber section for the evaporator or evaporators. This thereby increases the capacity for refrigerant evaporation in the evaporator or evaporators and, consequently, makes for lower temperatures in a system of this kind. This is desirable where and when high temperatures of the ambient air exist.

The functioning of this evaporatively-cooled section of the absorber can be controlled, if this is desired, by regulating the heat input to the generator. For instance, it may be desirable to use this additional refrigeration capacity only in very hot weather, in which case the system and the fluids can be so proportioned and the normal heat input to the generator be such that there is not enough refrigerant driven off the contents of the generator and condensed to provide sufficient refrigerant liquid to reach the evaporative chamber of this section of the absorber. In that event this section of the absorber will function just like a heat exchanger.

If it becomes desirable, because of increased temperatures of the ambient air, to increase the cooling capacity of the evaporator or evaporators and lower the temperatures therein, the heat input into the generator can be increased, thereby driving off a greater proportion of refrigerant from the absorbent and condensing more refrigerant in the condenser, thereby providing a surplus of liquid refrigerant which will flow into the evaporative chamber of this section of the absorber, automatically setting into operation

2 this evaporatively-cooled section of the absorber to increase the refrigerating capacity of the evaporator or evaporators.

In the drawings:

Fig. 1 is a flow diagram of my improved absorption refrigerating system.

Fig. 2 is an enlarged flow diagram of the generator.

Fig. 3 is an enlarged flow diagram of the evaporatively-cooled absorber section.

The usual authorized color symbols are used to indicate blue (weak liquor), red (strong liquor), yellow (refrigerant vapor), green (inert gas), and brown (refrigerant ammonia).

It will not be necessary to designate some of the operating units by reference characters as these are designated by descriptive words which are more informative to one looking only at the drawings. The generator is a special generator involving a submerged vapor lift and separator, which is described and claimed in my copending application Serial No. 744,202, filed April 26, 1947, now abandoned, which application has been superseded by application Serial No. 98,722, filed June 13, 1949.

It is not necessary to describe in detail the working of a constant pressure refrigerating system. It is sufficient to say here that this submerged vapor lift and generator provide a generator of greater capacity in minimizing heat losses and making use to the maximum of all the heat input in the generator. It operates on the principle of building up difference in pressures in the upper and lower compartments A and B of the generator by stacking one hydraulic pressure column on another to provide a high and low liquid level in these two compartments. This is explained and claimed in the aforementioned application. These compartments are separated by a partition 30 which extends upwardly and the central portion of the upstanding portion of the boiler to form two legs 31 and 32 in the upper compartment and one central upgoing leg 33 in the lower compartment. A vapor-collecting dome 6 is provided at the top of the upgoing leg 33 and orifice feed tube 3 discharges the collected vapor into the orifice in the vapor lift tube 2 at the lower end. The vapor lift tube discharges into separator 4 which discharges vapor through vapor discharge tube 10 to lower portion of the low-liquid-level chamber A from whence it may rise in countercurrent to the incoming cool rich liquors from the absorber.

The high liquid level is in the lower compartment, and this serves to drive the weak liquor through port 7 and into the heat exchange jacket D, thence up to a level 50 in vent tube 51 above the rich liquor in the system which will permit the weak liquor to reach the required height for delivery to the absorber at point 3a, and particularly the evaporatively-cooled section of the absorber. However, this is no part of the present invention as it will be obvious that other means of causing the circulation would do equally well, such as the common form of vapor pump that raises the hot weak liquor to a separator which is elevated sufficiently to flow the separated weak liquor back to the delivery level of the absorber by gravity.

The heat put into the generator serves to drive the ammonia vapor from the rich liquor that is passed by gravity from the "Receiver" in the bottom of the absorber to the generator at a lower level. This rich, comparatively cool liquor, passes down the inner tube 12 and passes in heat exchange relation with the weak liquor tube 1. This is a common arrangement in nearly all absorption systems of refrigeration. The rich liquor enters the generator at the point 20 and rises therein to the low liquid level 21, which is the level of the liquid in the strong liquor receiver. The ammonia evaporates. The yellow symbol in connection with the red symbol indicates the refrigerant vapors rising or bubbling up in the liquor in the generator. The yellow symbol above the lower liquid level 21 in the generator indicates the ammonia vapors passing up through the conduit 22 to the condenser where the vapors are subject to air cooling and are converted into the liquid refrigerant which is indicated by the symbol for brown. This liquid refrigerant passes through the conduit 23 to the "Food compartment evaporator" where it passes through a conduit 28 that is bonded to the inert gas return tube 25 from the absorber, which in turn is bonded to the evaporator tube 27 in which the mixture of inert gas and refrigerant vapor is on the way towards the absorber. These bonded tubes also turn upwardly in an elbow and then horizontally to form an element which is labeled the "Holding compartment evaporator." This is the compartment that is designed to freeze both ice cubes and keep foods frozen. This much of the apparatus is described and claimed in my prior application Serial No. 708,603, filed November 8, 1946, now abandoned. It is not necessary to describe this more fully as it is no part of the present invention because my evaporatively-cooled absorber can be used and is useful with the single evaporator refrigerator which serves to freeze water for ice cubes and also provides refrigeration for the food compartment.

The refrigerant vapor and inert gas mixture tube 24, which leads toward the absorber, is bonded to the return inert gas tube 25 between the "Food compartment evaporator" and the "Vegetable bin evaporator." The refrigerant vapor and inert gas mixture tube 24 continues to be bonded to the return inert gas tube 25 below the "Vegetable bin evaporator." It is the horizontal run of this tubing which constitutes the evaporatively-cooled section of the absorber. The weak liquor conduit, where it leaves the liquid heat exchanger 12—1, has a horizontal tube 1 provided with air-cooling fins 26 to facilitate further cooling of the weak liquor by the ambient air. The weak liquor conduit 1 passes up to the top section of the absorber where it passes to the left to point 2a, and it is bonded to the tubes 4a and 5 which are the upgoing and downgoing tubes of the inert gas circuit. All these tubes are bonded together and the whole heat insulated by insulation 40. The weak liquor tube passes from 2a to 3a in bonded relation with these bonded-together inert gas tubes. At the point 3a a port is provided from the tube 1 into the return inert gas tube 4a of the evaporatively-cooled absorber section. The weak liquor drains along the bottom of this return tube 4a back into the lower coils of the absorber. See the liquid stream 41 which in Fig. 3 is shown as weak liquor becoming strong liquor. This brings about these results:

In this triple heat exchanger there is heat still remaining in the weak liquor line and there is more heat evolved by the absorption of refrigerant vapor in the weak liquor. This heat is communicated to the residuum of liquid refrigerant 42 drained down in the downgoing horizontal inert gas circuit pipe 5. This serves to evaporate this remaining refrigerant liquor. This cools the weak liquor, that is, the absorbent, and at the same time increases the pressure of the refrigerant vapor passing to the low air-cooled portion of the absorber. Both these conditions are conducive to better absorption of the refrigerant in the water. In fact, the temperature of the absorbent may be as much as 60° lower than what its temperature would be by air cooling that has taken place before it reaches the evaporative section of the absorber. This much lower temperature makes the water much more efficient in absorbing ammonia vapor. The end result is that this evaporatively-cooled section of the absorber has a capacity to absorb refrigerant vapor still remaining in the inert gas stream as it comes out of the air-cooled portion of the absorber. Hence, the amount of refrigerant vapor in the inert gas stream, when it returns to the evaporator or series of evaporators, is minimized by this evaporatively-cooled section of the absorber. The refrigerant vapor pressure in the evaporator is lowered and the inert gas pressure is higher than in the conventional inert gas refrigeration cycle. This gives the evaporator or evaporators a much greater capacity for evaporation at high ambient temperature absorber cooling and, consequently, permits the attainment of much lower temperatures in the evaporator or evaporators than has been possible with the normal input of heat energy into the generator.

The advantage of this absorber is in the ability to remove refrigerant vapor accompanying the inert gas mixture passing through tube 4a at the lower temperature therein to a much greater extent than would be possible if the last absorption of the refrigerant vapor from the inert gas mixture were accomplished upon leaving the absorber at point 6a which is cooled only to near room temperature.

In effect, the removal of refrigerant vapor from the inert gas mixture passing in tube 4a is accomplished by a substantially equal increase in refrigerant vapor in the inert gas mixture passing through tube 5. The increase of refrigerant vapor in the mixture passing through tube 5 increases the partial pressure of the refrigerant vapor in this mixture. The liquid absorbent, prior to leaving for the generator, has a capacity for absorbing this extra refrigerant vapor because of the increased partial pressure of the refrigerant vapor. In turn, this added concentration of refrigerant in the absorbent is separated from the absorbent strong liquor in the generator at a lower temperature than would otherwise be true in the generator operation, by utilizing lower temperature heats available in the generator. Thermodynamically, the advantage of the heat exchange device is in the removal of refrigerant vapor from the inert gas, thereby increasing the refrigeration potential of the inert gas and at the same time securing low temperature evaporation in the evaporator.

When it is not necessary or desirable to so increase the evaporating capacity of the evaporator or evaporators because the ambient air is relatively cool, the input of heat energy into the generator may be cut down by cutting down the flow of gas to the burner or cutting down the electrical input, if an electrical heater is used. This, as explained in the preamble to the specification, will decrease the emission of refrigerant vapor from the generator and less liquid refrigerant will be condensed—insufficient to drain down into the evaporative chamber of the evaporatively-cooled absorber. Consequently, the system will function automatically with this improved absorber section cut out, as it were. If then at any time it is desirable to increase the refrigerating capacity of the evaporators, the heat input is increased and the evaporatively-cooled section of the absorber immediately goes to work to increase the evaporating capacity of the evaporator or evaporators to get more refrigeration and lower temperatures.

I claim:

1. The method of operating an absorption refrigeration system of the constant pressure type which includes, an evaporator, an absorber, a generator, a condenser, an inert gas refrigeration vapor circuit including the evaporator and the absorber, and a rich and weak liquor circuit including the absorber and the generator, which method comprises separating and condensing an amount of refrigerant in excess of the needs of the evaporator and flowing the excess through the evaporator and then into heat exchange relation with a relatively long but small cross-section stream of hot weak liquor in the absorber where evaporation of the excess refrigerant takes place to cool such stream and directing the stream of inert gases in their final movement in the absorber on their return to the evaporator in countercurrent along a long path of contact with said cooled weak liquor stream and thereby, by such sub-cooling of the weak liquor, denuding the inert gas stream returning to the evaporator of entrained refrigerant vapor.

2. An absorber for constant pressure absorption refrigeration system, the latter having a generator, condenser, evaporator, absorber, an inert gas circuit including absorber and evaporator and a liquor circuit including absorber and generator, said absorber comprising an evaporatively-cooled section and a fluid-cooled section, the inert gas circuit including a return gas conduit leading from the fluid-cooled section to the evaporator and a mixed inert gas and refrigerant vapor conduit leading from the evaporator to the fluid-cooled section, said conduits paralleling each other across the top of the absorber and being in heat exchange relation with each other and forming the evaporatively-cooled section of the absorber, the mixed gas and vapor conduit from the evaporator flowing excess liquid refrigerant from the evaporator into the absorber evaporative section, and a return weak liquor conduit paralleling and in heat exchange relation with said inert gas conduits at the location where they are in heat exchange relation with each other, said weak liquor conduit discharging the weak liquor in a stream in the return inert gas conduit near where it leaves the evaporatively-cooled absorber section, the weak liquor flowing in said inert gas return conduit through the length where it parallels the mixed gas and vapor conduit to form the evaporatively-cooled absorber section and the weak liquor then flowing down into the fluid-cooled absorber section, thereby to increase the cooling capacity of the evaporator by taking the non-absorbed refrigerant vapors out of the returning inert gas by absorbing the same in sub-cooled weak liquor absorbent and transferring the heat let out by such absorption to the mixed refrigerant vapor and inert gas conduit to thereby cause evaporation of the liquid refrigerant to sub-cool the absorbent and increase the partial pressure of the refrigerant vapor to increase absorption in the absorber, thereby to enrich the liquor passing to the generator and minimize the absorbent vapor passing in the return inert gas stream to the evaporator.

3. An absorber for constant pressure absorption refrigeration system, the latter having a generator, condenser, evaporator, absorber and an inert gas circuit including absorber and evaporator and a liquid circuit including absorber and generator, said absorber including a fluid-cooled section of tube, and an evaporatively-cooled section comprising a run of the return inert gas tube leading from the fluid-cooled absorber section to the evaporator and a run of the mixed inert gas and refrigerant vapor tube leading from the evaporator to the fluid-cooled section of the absorber, said runs of inert gas tubes being in immediate heat exchange relation with each other along a long path, said mixed gas and vapor tube receiving at the upper end of the absorber "tailings" of liquid refrigerant flowing from the evaporator, and a weak liquor tube discharging the weak liquor in a stream into the said run of return inert gas tube near where it leaves the evaporatively-cooled absorber section for the evaporator, the liquor flowing in said run of tube throughout the length of the evaporatively-cooled absorber section, then down into and through the fluid-cooled absorber section.

4. The combination claimed in claim 3 in which the said runs of inert gas tubes are bonded together.

5. The combination claimed in claim 3 in which the said runs of inert gas circuit tubes and the weak liquor tube are secured together in heat exchange relation along a long path.

6. The method of operating an absorption refrigeration system of the constant pressure type which includes, an evaporator, an absorber, a generator, a condenser, an inert gas refrigeration vapor circuit including the evaporator and the absorber, and a rich and weak liquor circuit including the absorber and the generator and a heat exchanger, which method comprises separating and condensing an amount of refrigerant in excess of the needs of the evaporator and flowing the excess into heat exchange relation with a relatively long but small cross-section stream of hot weak liquor where evaporation of the excess refrigerant takes place to cool such stream and directing the stream of inert gases in their final movement in the absorber on their return to the evaporator in countercurrent along a long path of contact with said cooled weak liquor stream and thereby, by such sub-cooling of the weak liquor, denuding the inert gas stream returning to the evaporator of entrained refrigerant vapor, the weak liquors returning from the generator and the liquid heat exchanger being conducted in a relatively long path of out-of-contact heat exchange relation with the evaporatively cooled weak liquor stream before the returning weak liquor is brought into contact with the inert gas stream returning to the evaporator.

7. The combination claimed in claim 2 combined with said evaporator and condenser and said generator, recited in the preamble of the claim, and in which the generator has a variable heat input to control the overflow of the liquid refrigerant from the evaporator to the evaporatively-cooled section of the absorber and thereby control the evaporating capacity of the evaporator.

WALTER L. EDEL.

REFERENCES CITED

The following references are of record in the file of this patent:

UNITED STATES PATENTS

| Number | Name | Date |
|---|---|---|
| 1,711,533 | Von Platen et al. | May 7, 1929 |
| 2,452,699 | Sutton | Nov. 2, 1948 |